United States Patent [19]

Shurts

[11] 3,912,698

[45] Oct. 14, 1975

[54] ETHYLENE/α-OLEFIN COPOLYMERIZATION PROCESS

[75] Inventor: Edward Lytle Shurts, Wilmington, Del.

[73] Assignee: E. I. Du Pont de Nemours and Company, Wilmington, Del.

[22] Filed: Dec. 6, 1973

[21] Appl. No.: 422,614

Related U.S. Application Data

[63] Continuation-in-part of Ser. No. 189,587, Oct. 15, 1971, abandoned.

[52] U.S. Cl. ..... 260/80.78; 260/88.2 R; 260/94.9 P
[51] Int. Cl.² ..................... C08F 2/06; C08F 10/02; C08F 36/20
[58] Field of Search ............ 260/88.2, 80.78, 94.9 P

[56] References Cited
UNITED STATES PATENTS 3,637,616    1/1972    Petersen ......................... 260/80.78

Primary Examiner—Edward J. Smith

[57] ABSTRACT

Reactor inlet fouling is substantially reduced and the reactor capacity is increased in a copolymerization process which produces a copolymer of ethylene and at least one $C_3$–$C_7$ alpha-olefin, the proportion of ethylene in the product being about 65–80 weight percent, wherein the starting monomers are introduced into the reactor both as vapors and as liquid, and at least part of the reactor off-gas is condensed; the condensed liquid is partially vaporized substantially adiabatically to form liquid and gas streams which are recycled to the reactor; the liquid stream is heated and partly vaporized, the remaining recycle liquid having less than about 20 moles percent ethylene.

9 Claims, 1 Drawing Figure

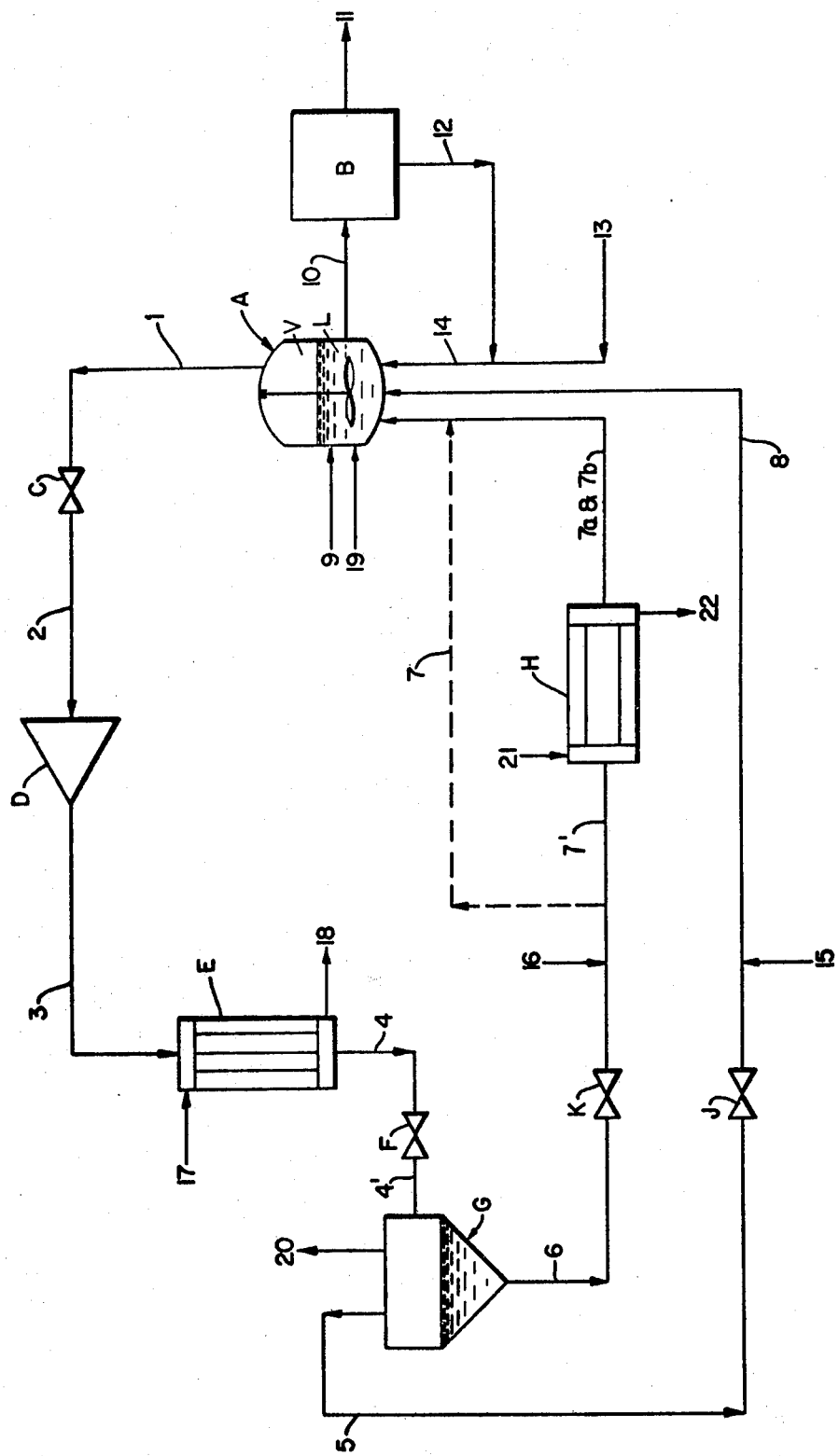

ETHYLENE/α-OLEFIN COPOLYMERIZATION PROCESS

CROSS-REFERENCE TO RELATED APPLICATION

This is a continuation-in-part of my application Ser. No. 189,587, filed Oct. 15, 1971, now abandoned.

BACKGROUND OF THE INVENTION

This invention relates to the continuous copolymerization of ethylene and at least one other alpha-olefin in solution in a hydrocarbon using coordination catalysis.

The polymerization of ethylene with one or more alpha-olefins, such as propylene, in solution using coordination catalyst systems is well known. The polymerization can be conducted continuously to obtain an ethylene copolymer, dissolved in the solvent, which is continuously removed and isolated by known means. Unreacted monomers leaving the reactor are recovered and recycled to the reactor along with fresh monomers to replace those polymerized. Owing to different reactivities, the monomers polymerize at different rates which can be controlled by regulating their concentrations in the presence of coordination catalyst systems. For example, to obtain a copolymer of ethylene and propylene having approximately 50 mole per cent of each monomer in the copolymer, a large excess of propylene, e.g., greater than 10:1 mole ratio, is necessary in the catalyst-containing solution in the reactor. A copolymerization conducted in a solution containing about equal amounts of ethylene and propylene, produces a copolymer extremely high in ethylene content, which under ordinary polymerization conditions, e.g., about −20° to about 80°C., would not be soluble in the saturated hydrocarbon solvents used as the polymerization medium.

When ethylene and propylene are polymerized in a reactor having both liquid and vapor phases, the mole ratio of propylene to ethylene in the vapor phase will be far less than the propylene to ethylene mole ratio in the liquid phase because of the greater volatility of ethylene. For example, if the propylene to ethylene mole ratio in the liquid phase is about 10:1, the propylene to ethylene mole ratio in the vapor phase above it may be only about 1:1 to about 3:1.

It is known in the art to cool such polymerization reactors by evaporation and removal of unreacted monomers from the vapor space, these monomers being cooled and recycled to the reactor. Reactors cooled in this manner are referred to as evaporatively cooled reactors. Polymer is recovered from the reaction mixture by withdrawing polymer solution from the reactor and separating unreacted monomers which are usually recycled to the reactor.

In a typical continuous solution polymerization process for copolymerizing ethylene and an alpha-olefin, such as propylene, the monomers are introduced into the reactor from three sources: (a) fresh or makeup monomers, usually in the ratio that they are present in the polymer being produced (usually a propylene to ethylene (P/E) mole ratio of 1:1 or less); (b) recycle monomers taken from the vapor space in the reactor (generally a P/E mole ratio of about 1:1 to about 3:1); and (c) recycle monomers stripped from the polymer solution leaving the reactor (typically a P/E mole ratio of at least about 10:1). The volumes of these streams are such that the amount of recycle monomers from the vapor space in the reactor will usually be so large, particularly when combined with that in the makeup monomer stream, that the total P/E mole ratio of the gas being introduced into the reactor is usually much less than 5:1 and sometimes even as low as 1:1. If streams characterized by such low P/E ratio are condensed and cooled or absorbed in solution such that they are introduced into the reactor entirely in the liquid phase, copolymers with a very high ethylene content will form on contacting the catalyst at the points of introduction into the reactor, e.g., at the monomer inlet port of the reactor. Such high ethylene-containing copolymers are generally insoluble at temperatures below about 80°C. in the polymerization solvent and their presence causes a very undesirable amount of reactor inlet fouling.

Reactor inlet fouling can be significantly reduced by introducing ethylene and propylene into the reactor both as a vapor and as a liquid in amounts wherein the ratio of liquid propylene to liquid ethylene is high enough for these monomers to form solvent-soluble copolymer when they contact the catalyst in the reactor. This process, which is described in U.S. Pat. No. 3,637,616 to Petersen, is very useful; but its capacity is somewhat limited when the P/E molar ratio of the recycle feed stream is low (e.g., below 2:1) because only a small portion of the stream (e.g., 20% or less) can be introduced as a liquid having a P/E molar ratio of 5:1 or greater, the latent heat of evaporation of this liquid making the largest contribution to reactor cooling. Capacity is the amount of copolymer produced by the process in a given volume of reaction mixture in a unit of time.

The problem becomes particularly serious when it is intended to produce a copolymer of ethylene with at least one alpha-olefin containing at least 65 weight percent of the ethylene component. With such high proportions of ethylene, the danger of reactor fouling in the Petersen process is ever present unless the process is run under rigorously controlled conditions, with small margin of error. The amount of gas that can be condensed under those conditions is necessarily small. It has also been observed that when the proportion of ethylene in the copolymer reaches about 80%, the copolymer tends to be insoluble in the polymerization solvent, and reactor inlet fouling cannot be avoided in any event.

There is a need for a simple, low-cost method for improving the capacity of the process for the solution polymerization of ethylene and at least one other alpha-olefin in an evaporatively cooled reactor to a copolymer containing at least 65 weight percent of ethylene.

SUMMARY OF THE INVENTION

According to this invention, there is provided an improvement in the continuous process for preparing in solution hydrocarbon-soluble copolymers of ethylene and at least one $C_3$–$C_7$ alpha-olefin with a coordination catalyst in a $C_5$–$C_8$ aliphatic hydrocarbon solvent in an evaporatively cooled reactor at about −20°C. to about 80°C., to a copolymer containing about 65–80 weight percent of the ethylene component, wherein ethylene and $C_3$–$C_7$ alpha-olefin are introduced into the reactor as both vapor and liquid and at least part of the reactor off-gas is condensed and the resulting condensate is partially vaporized substantially adiabatically to form a liquid/gas stream which is recycled to the reactor; the improvement consisting essentially of maintaining the ethylene content of the off-gas at about 25–75 mole percent, condensing at least about 25 mole percent of the off-gas and heating and partially vaporizing the resulting condensate to obtain a recycle liquid having less than about 20 mole percent ethylene.

BRIEF DESCRIPTION OF THE DRAWING

The drawing is a flow sheet of a preferred embodiment of the invention described in detail below.

DETAILED DESCRIPTION OF THE INVENTION

This invention is generally applicable to the copolymerization of ethylene with at least one $C_3$–$C_7$ alpha-olefin, such as propylene and 1-butene which are preferred.

Typically, the polymers produced by the process of this invention will be aliphatic hydrocarbon soluble copolymers of ethylene containing about 20–35% $C_3$–$C_7$ alpha-olefin by weight, and will preferably contain about 25–35% of the alpha-olefin on this basis. Although the proportion of the alpha-olefin in the copolymer is not critical to the successful operation of this invention, the particular advantages realized by the process of the present invention do not become apparent unless the proportion of ethylene in the copolymer product is at least about 65% by weight. By the term "hydrocarbon soluble copolymers" is meant that copolymer formed in the process is soluble at reactor temperature in a $C_5$–$C_8$ aliphatic hydrocarbon solvent.

A minor amount of one or more other monomers can also be copolymerized. In a preferred embodiment of this invention a non-conjugated hydrocarbon diene of from about 5 to 22 carbon atoms and containing only one polymerizable double bond, practically speaking, is present during the copolymerization process in amounts up to about 10 weight per cent based on total solution. Representative dienes are 1,4-hexadine, dicyclopentadiene, 5-methylene-2-norbornene, 5-ethylidene-2-norbornene, and 1,5-cyclooctadiene. The general preparation of such copolymers is set forth in U.S. Patents to Gresham et al., U.S. Pat. No. 2,933,480; Tarney, U.S. Pat. No. 3,000,866; Gladding et al., U.S. Pat. Nos. 3,063,973 and 3,093,620; Gladding, U.S. Pat. No. 3,093,621; Adamek et al., U.S. Pat. No. 3,211,709; and Natta et al., U.S. Pat Nos. 3,260,708 and 3,300,459.

Throughout this disclosure, the term "copolymerization" or "copolymer with at least one alpha-olefin" will thus also include copolymerization and copolymers of ethylene with at least one alpha-olefin and a minor amount of one or more other monomers, especially nonconjugated dienes.

When a nonconjugated hydrocarbon diene is present during polymerization, the copolymer produced will typically contain about 1–20% by weight of the diene, preferably about 2–8% by weight. However, the proportion of the diene in the soluble copolymer is not critical to the successful operation of this invention.

The invention is most useful when the polymerization is conducted in an aliphatic (including cycloaliphatic) hydrocarbon solvent. Typical examples of the above are solvents containing from about 5–8 carbon atoms such as pentane, cyclohexane, hexane, and heptane. Compatible mixtures of solvents can also be employed.

The polymerization process is conducted in the presence of conventional coordination catalyst systems but for each catalyst combination a particular $C_3$–$C_7$ alpha-olefin/ethylene (O/E) mole ratio in the solution in the reactor may be required to yield a given alpha-olefin content in the polymer. Moreover, with each catalyst system the O/E mole ratio for the liquid monomers in the polymerization solution must be maintained above a certain minimum in order to form copolymer sufficiently low in ethylene content to be soluble in the solvent. Preferred catalyst systems are soluble vanadium-based coordination catalysts. Particularly preferred are those containing vanadium trisacetylacetonate (VAA)/diisobutyl aluminum monochloride (DIBAC), vanadium tetrachloride ($VCl_4$)/DIBAC, vanadium oxytrichloride ($VOCL_3$)/ ethyl aluminum ethoxide/DIBAC/benzotrichloride, and $VOCl_3$/ DIBAC. In using such catalysts, suitable aluminum to vanadium (Al/V) mole ratios and amounts of catalyst employed per liter of total solution will depend on the specific catalyst components and conditions employed. These are well known. Aluminum/vanadium mole ratios will usually be within the range 2–50. Likewise, the amount of catalyst, expressed as vanadium content usually amounts to about 0.00001–0.002 moles per liter of polymerization reaction mixture. Coordination catalyst compositions containing compounds which enhance their activity, such as benzotrichloride, hexachloropropene and adjuvants such as Lewis Bases can be employed.

The temperature at which the polymerization reactor is operated will have some effect on the maximum proportion of ethylene units which can be tolerated for solubility in an aliphatic hydrocarbon polymerization solvent. Generally, the solubility of high-ethylene content polymers in the polymerization solvent increases with temperature. While the polymerization reactor can be operated satisfactorily at temperatures ranging from about −20°C. to about +80°C., it is preferred that the reaction be conducted within the range of about 20°C. to about 60°C.

The invention will be further described with respect to copolymerization of ethylene with propylene as the $C_3$–$C_7$ alpha-olefin utilized and 1,4-hexadiene as a third monomer, this polymerization being greatly preferred. Ethylene is fed to the reactor both as a vapor and as a liquid in such amounts that the ratio or liquid propylene to liquid ethylene being fed to the reactor is high enough to produce a soluble polymer. The upper limit on P/E (i.e., propylene/ethylene) mole ratio in the liquid feed is not critical insofar as the elimination of insoluble polymer is concerned; it will generally not be higher than the P/E mole ratio in the reactor liquid phase. A practical determination of the minimum P/E mole ratio in the liquid fed to the reactor under a given set of conditions can be made by setting up the continuous process with the desired amount of (1) recycle monomers stripped from the product, (2) recycle of reactor off-gas, and (3) make-up monomers, and conducting the polymerization with decreasing P/E mole ratios in the liquid feed to determine the point at which unacceptable reactor inlet fouling occurs. It is preferred that the vapor phase in the reactor have a P/E mole ratio of less than about 2:1.

The process of this invention can be more readily understood by reference to the drawing which is a flow sheet illustrating continuous copolymerization of ethylene, propylene and 1,4-hexadiene in hexane in reactor (A) which has vapor phase (V) above liquid phase (L). A coordination catalyst, formed by premixing $VCl_4$ with DIBAC, is introduced into reactor (A) through conduit 9. A liquid stream 10 is continuously removed from the liquid phase of reactor (A) and polymer isolated from the stream 10 at (B) by conventional techniques. Polymer is removed at 11 and collected. Liquid stream 12 from the copolymer isolation process is combined with fresh 1,4-hexadiene and solvent from stream 13 to form stream 14 which is fed to reactor (A).

Overhead vapor phase stream 1 from the reactor (A), also referred to herein as the reactor off-gas stream, containing chiefly unpolymerized ethylene and propylene, plus hexane and lesser amounts of other volatile materials, is passed through let-down valve (C) to form stream 2 which is fed into compressor (D) where it is compressed. Valve (C) regulates the flow rate of reactor off-gas to maintain constant reactor temperature. Compressed gas stream 3 is sent to condenser (E) (cooled by liquid entering via conduit 17 and leaving via conduit 18) wherein condensation occurs and liquid/gas stream 4 formed. The compressor operates at a pressure significantly higher than the reactor pressure, therefore, stream 4 is passed through a flash valve (F) to reduce the pressure of the stream and from a liquid/gas stream 4'. Stream 4' is passed into purge pot (G) where liquid and uncondensed gas from stream 4' separate, uncondensed gas being recycled as stream 5 to reactor (A). Valve (J) is used to maintain pressure on (G). Stream 5 can be combined with ethylene makeup monomer from stream 15 to form stream 8 which flows to reactor (A). There is significant advantage in recycling all or part of the gas in stream 5 in this manner. The temperature of the gas at 5 is lower than the reactor temperature, thus recycling of this gas to the reactor provides cooling for the removal of sensible heat from the reaction.

Vent line 20 can optionally be used on purge pot (G) to permit removal of volatile impurities in the system. For example, methane, ethane, and nitrogen are generally found in the off-gas stream 1 and are preferably removed from the system at 20. Nitrogen enters the system as solute in the polymerization solvent. For reasons of safety, the solvent is generally stored prior to use under a nitrogen gas blanket in a separate vessel not shown in the drawing.

The condensate in stream 6 from purge pot (G) is passed through liquid level control (K), a valve used to maintain the liquid level in the purge pot. Too high a liquid level in the purge pot will result in overflow of liquid into the gas stream 5. Discharge of all the liquid out of the purge pot will permit the passage of recycle gas through the recycle liquid stream. Both of these conditions can be avoided by automatic or manual regulation of liquid level control (K).

In a process such as that described in U.S. Pat. NO. 3,637,616 to Petersen, the liquid 6 from the purge pot (G), containing mainly ethylene and propylene, has generally been combined with liquid propylene makeup monomer from stream 16, and fed to reactor (A) as stream 7. The molar ratio of propylene to ethylene in liquid stream 7 entering the reactor is at least 5:1.

It has now been found that addition of a heat exchanger to the liquid recycle stream will permit an appreciable increase in reactor capacity while practically eliminating reactor inlet fouling. This finding is surprising in view of the fact that merely multiplying adiabatic flashing stages in the Petersen has been calculated to produce a marginal capacity improvement at best, even with up to ten such flashing stages.

Accordingly, liquid recycle stream 6 is combined with make-up propylene monomer from stream 16 to form stream 7' which is fed to heat exchanger (H) where the stream is heated and partially evaporated to obtain a recycle stream having a vapor phase 7a and a liquid phase 7b.

Heating of liquid stream 7' increases its P/E mole ratio by preferentially evaporating the more volatile ethylene and prevents formation of insoluble copolymer at the reactor inlet. Moreover, the liquid/gas stream leaving the heat exchanger has a liquid phase 7b which is a larger portion of stream 1 than was the liquid stream 7 in the previously known process in which no heat exchanger was employed. In other words, when the temperature of the condensate from condenser (E) is low enough to cause the P/E ratio of the condensate at reactor pressure to be below the limit needed to prevent reactor inlet fouling, the temperature of the condensate 6 recycled to reactor (A) can be raised by heat exchanger (H) to obtain the desired P/E ratio in the liquid phase 7b of the recycle stream. Use of a heat exchanger (H) surprisingly results in a greater porportion of liquid 7b in the recycle stream thereby providing increased evaporative cooling and increased capacity.

Thus, this invention provides more evaporative cooling per unit of off-gas than prior art processes requiring control of liquid feed composition. This additional evaporative cooling provides an increase in reactor capacity.

Since condenser (E) can be operated at a lower temperature, high pressure, or both lower temperature and higher pressure than similar means of prior art processes, another advantage obtains, namely, the temperature of the gas phase of stream 4' is lower than in prior art processes. Since the temperature of gas recycle stream 5 is similarly lower, it follows that this colder gas recycle stream provides for the removal of more sensile heat from the reaction per pound of gas recycled. This additional cooling thereby further contributes to increasing the reactor capacity.

Heat exchanger (H) can be any of the types known in the art for heat transfer between a heating medium, such as steam, and a liquid/gas mixture. For example, shell and tube, double-pipe, and plate-type heat exchangers can be used. The heating medium introduced as stream 21 can be steam, Dowtherm, or other hot gas or fluid. Heating fluid is discharged from heat exchanger (H) as stream 22.

The amount of heat to be supplied to the heat exchanger can be readily determined from the values of process variables for similar prior art processes. For example, given the temperature of stream 7 in a typical prior art process and knowing that the temperature of 7a and 7b in the process of this invention can be about the same as stream 7, the amount of heat to be supplied can be readily determined from the heat transfer characteristics of the heat exchanger, and the flow rate and temperature of material in stream 7'.

One of the purposes of heat exchanger (H) is to obtain a liquid/gas stream having the proper P/E mole ratio. Thus, raising the temperature of streams 7a and 7b to about the same temperature as stream 7 is but one method of obtaining the desired P/E mole ratio. For example, the temperatures of streams 7a and 7b do not necessarily have to be the same as stream 7. Knowning the composition, temperature and pressure of stream 7' from the purge pot (G), the pressures of streams 7a and 7b, and the P/E mole ratio desired in liquid stream 7b, the amount of heat which must be added via heat exchanger (H) can be determined.

The pressure in condenser (E) is not critical but generally is at least about 300 psi., and preferably 300–500 psi. The pressure in the reactor is also not critical and is dependent on the temperature and monomer concentrations in the reaction medium.

The amount of reactor off-gas to be condensed and recycled to the reactor can be calculated from the amount of cooling required for the quantity of polymer being prepared. The amount of reactor off-gas required depends upon the quantity and fraction of off-gas condensed. For example, knowing the desired P/E mole ratio in liquid recycle stream 7b, one can calculate the amount of gas to be condensed. However, certain process parameters are fixed, for example, the maximum operating pressure of the compressor (D), the temperature of the cooling fluid 17 to condenser (E), the size of condenser (E), the heating capacity of heat exchanger (H), etc. Values can then be assigned to the variables in the system and trial calculations performed by hand or with the aid of a computer until the proper P/E ratio in liquid stream 7b is obtained.

The pressure in the purge pot (G) should preferably be a few psi. higher than the pressure in reactor (A). This permits recycling streams 5 and 6 to the reactor without the aid of additional energy means such as a pump or blower. Pressure losses through the recycle lines and equipment can be compensated routinely.

The temperature and pressure in the purge pot (G) determine the split between liquid and vapor in the purge pot. The proper split in the purge pot varies with the P/E mole ratio in the liquid recycle stream 7b and the off-gas stream 1 previously described. Once the proper split is determined as described in connection with amount of gas to be condensed, the liquid/gas stream 4 can be partially flashed through valve (F) to effect the split. Thus there are numerous combinations of temperature and pressures at which stream 4 can be operated and yet obtain the proper liquid/vapor split in purge pot (G) by the regulation of flash valve (F). Similarly, the temperature and flow rate of the cooling medium 17 to condenser (E) are not critical. The system can be accommodated to cooling fluid maintained at fixed conditions. Further, if the condenser is operated under conditions such that the temperature of stream 4 is at the temperature required to obtain the proper liquid/vapor split in purge pot (G), then flash valve (F) can be eliminated. This will generally not be economical since the temperature of cooling liquid 17 to condenser (E) must then be maintained by costly refrigeration equipment.

Condenser (E) can be operated at a relatively high pressure using the process of this invention, and as a result, the temperature of gas recycle stream 5 will be relatively low, thereby providing more sensible cooling (removal of sensible heat of reaction) for the reactor. This can be accomplished by operating the compressor at a relatively high pressure resulting in higher pressure for gas stream 3 and liquid/gas stream 4. Then it is necessary to flash a larger porportion of stream 4 at (F) to obtain the proper pressure in the purge pot (G), and this increased amount of flashing will lower the temperatures of streams 5 and 6 from the purge pot below those utilized in prior art processes.

This invention permits preparation of ethylene, propylene copolymers, whose utility as valuable elastomers is well known, by an improved process which affords increased reactor capacity with a minimum of reactor fouling. Polymer of excellent quality can be produced with good catalyst efficiency.

The operation of the process of this invention and the advantages thereof will be further apparent from the following example in which all parts, proportions, and percentages are by weight unless otherwise indicated.

EXAMPLE

An elastomeric copolymer (containing 71 weight per cent ethylene, 25 weight per cent propylene, and 4 weight per cent 1,4-hexadiene units) is made in solution in hexane in a 14-gallon evaporatively cooled reactor operated at 57°C. and 256,3 psig. with a residence time of 20.4 minutes. The coordination catalyst used is formed in situ by combining diisobutylaluminum chloride with $VCl_4$ (Al:V=4.5). Reactor liquid effluent (containing 8.20 weight per cent copolymer) passes through product isolation stages where solvent and unreacted monomers are removed for recycle to yield copolymer at the rate of 16.25 lbs./hr.

The process equipment pertinent to this example is shown in FIG. 1. Catalyst components enter reactor (A) by conduit 9. Makeup ethylene, propylene, and 1,4-hexadiene are separately introduced by feed lines 15, 16 and 13 joining conduits 8, 6 and 14, respectively. Conduit 14 returns to reactor (A) the monomers recovered from the copolymer isolation stage. Gaseous monomers for sensible cooling and liquid monomers for evaporative cooling flow to reactor (A) along conduits 8 and 7', respectively. Off-gas from reactor (A) containing 36.2 mole per cent ethylene passes along conduit 1, through a let-down valve (C), along conduit 2 to the suction side of compressor (D), and thence along conduit 3 to condenser (E) where about 50.4 mole per cent is liquified. The condensate and uncondensed gas pass along conduit 4, through a flash valve (F) where flashing occurs, and thence to a gas/liquid purge pot (G). The cold (19°C.) gas is recycled along conduits 5 and 8 to reactor (A). The cold (19°C.) liquid phase exists from the bottom of purge pot (G) along conduit 6, passes through a level control valve (K), thence along conduits 6 and 7', and enters heat exchanger (H) where it is warmed to 35°C. to vaporize part of the liquid leaving 28 mole per cent of off-gas as condensate.

Tables 1 and 2 give the flow rates (in pounds) for the respective embodiments of the process of this invention and the control (which utilizes stream 7 rather than 7', 7a, 7b and the heat exchanger (H).

The process of this invention produces 16.25 pounds of copolymer each hour; the control makes only 11.25 pounds. The compressor exit stream is at 68.4°C. and 539.4 psig.; the control compressor is at 42.7°C. and 287.2 psig. Greater condensation is possible using the process of this invention. This result can be seen in the proportions of gas 5 and liquid 6 leaving the purge pot. The purge pot exit streams are much colder in the process of this invention than in the Control, 19° vs. 38.9°C.

TABLE 1

| STREAM | 1 | 2 | 3 | 4 | 5 | 6 | 7a | 7b | 8 | 9 | 10 | 14 |
|---|---|---|---|---|---|---|---|---|---|---|---|---|
| Temp. °C | 57.0 | 47.0 | 68.4 | 40.0 | 19.0 | 19.0 | 35.8 | 35.8 | 19.3 | 20.0 | 57.0 | 13.9 |
| psig. | 256.3 | 186.3 | 539.4 | 530.4 | 265.3 | 265.3 | 260.3 | 260.3 | 269.3 | 260.3 | 256.3 | 260.3 |
| Phase | Gas | Gas | Gas | Gas & Liquid | Gas | Liquid | Gas | Liquid | Gas | Liquid | Liquid | Liquid |
| FLOW RATE lb./hr. | | | | | | | | | | | | |
| Ethylene | 62.837 | 62.837 | 62.837 | 62.837 | 47.693 | 15.144 | 8.389 | 6.755 | 59.339 | .000 | 7.716 | 7.611 |
| Ethane | 4.286 | 4.286 | 4.286 | 4.286 | 2.942 | 1.344 | .634 | .715 | 2.946 | .000 | .857 | .848 |
| Propylene | 129.036 | 129.036 | 129.036 | 129.036 | 61.966 | 67.070 | 20.835 | 50.694 | 61.966 | .000 | 53.013 | 52.617 |
| Propane | 5.713 | 5.713 | 5.713 | 5.713 | 2.597 | 3.116 | .840 | 2.298 | 2.597 | .000 | 2.645 | 2.623 |
| 1,4-Hexadiene | 1.225 | 1.225 | 1.225 | 1.225 | .031 | 1.194 | .028 | 1.166 | .031 | .328 | 7.275 | 7.597 |
| Hexane | 19.916 | 19.916 | 19.916 | 19.916 | .529 | 19.387 | .472 | 18.915 | .529 | 5.043 | 110.043 | 105.000 |
| Nitrogen | 6.050 | 6.050 | 6.050 | 6.050 | 5.963 | .087 | .079 | .008 | 5.963 | .000 | .126 | .126 |
| Methane | .851 | .851 | .851 | .851 | .805 | .046 | .038 | .009 | .806 | .000 | .038 | .036 |
| Hydrogen | .202 | .202 | .202 | .202 | .201 | .001 | .001 | .000 | .201 | .000 | .002 | .002 |
| $VCl_4$ | — | — | — | — | — | — | — | — | — | .0353 | .0353 | — |
| $(iso-Bu)_2AlCl$ | — | — | — | — | — | — | — | — | — | .1454 | .1454 | — |

No. 11 - Copolymer = 16.250 lb./hr.

MONOMER STREAMS - lb./hr.
No. 13 - 1,4-Hexadiene = 0.765, 30.0°C., 300.0 psig.
No. 15 - Ethylene = 11.646, .004 Ethane, .001 Methane, 30.0°C., 300.0 psig.
No. 16 - Propylene = 4.459, .005 Ethane, .001 Methane, .022 Propane, 35.0°C., 300.0 psig.
Copolymer** = 11.537 Ethylene, 4.063 Propylene, 0.650 1,4-Hexadiene.
**lbs./hr. of Monomer Incorporated into the Copolymer.

TABLE 2

| STREAM | 1 | 2 | 3 | 4 | (CONTROL) 5 | 6 | 7 | 8 | 9 | 10 | 14 |
|---|---|---|---|---|---|---|---|---|---|---|---|
| Temp. °C | 57.0 | 47.0 | 42.7 | 40.8 | 38.9 | 38.9 | 38.5 | 39.3 | 20.0 | 57.0 | 13.9 |
| psig. | 248.2 | 186.3 | 287.2 | 272.2 | 257.2 | 257.2 | 252.2 | 261.2 | 252.2 | 248.2 | 252.2 |
| Phase | Gas | Gas | Gas | Gas & Liquid | Gas | Liquid | Liquid | Gas | Liquid | Liquid | Liquid |
| FLOW RATE lb./hr. | | | | | | | | | | | |
| Ethylene | 65.466 | 65.466 | 65.466 | 65.466 | 62.541 | 2.925 | 2.925 | 70.660 | .000 | 7.701 | 7.569 |
| Ethane | 4.942 | 4.942 | 4.942 | 4.942 | 4.639 | .303 | .307 | 4.642 | .000 | .855 | .848 |
| Propylene | 148.371 | 148.371 | 148.371 | 148.371 | 129.649 | 18.722 | 22.048 | 129.649 | .000 | 52.909 | 52.396 |
| Propane | 6.561 | 6.561 | 6.561 | 6.561 | 5.645 | .916 | .933 | 5.645 | .000 | 2.640 | 2.623 |
| 1,4-Hexadiene | 1.395 | 1.395 | 1.395 | 1.395 | .401 | .994 | .994 | .401 | .321 | 7.261 | 7.390 |
| Hexane | 22.677 | 22.677 | 22.677 | 22.677 | 6.674 | 16.003 | 16.003 | 6.674 | 4.898 | 109.898 | 105.000 |
| Nitrogen | 7.027 | 7.027 | 7.027 | 7.027 | 6.995 | .032 | .032 | 6.995 | .000 | .126 | .126 |
| Methane | .986 | .986 | .986 | .986 | .974 | .012 | .013 | .975 | .000 | .038 | .036 |
| Hydrogen | .235 | .235 | .235 | .235 | .235 | .001 | .000 | .235 | .000 | .002 | .002 |
| $VCl_4$ | — | — | — | — | — | — | — | — | .0244 | .0244 | — |
| $(iso-Bu)_2AlCl$ | — | — | — | — | — | — | — | — | .1007 | .1007 | — |

No. 11 - Copolymer = 11.250 lb./hr.

MONOMER STREAMS - lb./hr.
No. 13 - 1,4-Hexadiene = 0.530, 30.0°C., 300.0 psig.
No. 15 - Ethylene = 8.119, .003 Ethane, .001 Methane, 30.0°C., 300.0 psig.
No. 16 - Propylene = 3.326, .004 Ethane, .017 Propane, .001 Methane, 35.0°C., 300.0 psig.
Copolymer** - 7.987 Ethylene, 2.813 Propylene, 0.450 1,4-Hexadiene.
**lbs./hr. of Monomer Incorporated into the Copolymer.

I claim:
1. In the continuous process for preparing hydrocarbon-soluble copolymers with a coordination catalyst in a $C_5$–$C_8$ aliphatic hydrocarbon solvent in an evaporatively cooled reactor at about −20°C. to about 80°C. to a copolymer containing about 65–80 weight percent of the ethylene component, wherein ethylene and at least one $C_3$–$C_7$ alpha-olefin are introduced both as a vapor and as a liquid to the reactor, the vapor phase in the reactor having a propylene/ethylene mole ratio of less than about 2:1, and at least part of the reactor off-gas is condensed and the condensate partially vaporized substantially adiabatically to form a liquid/gas stream which is recycled to the reactor; the improvement of increasing the reactor capacity while avoiding reactor inlet fouling by maintaining the ethylene content of the reactor off-gas at about 25–75 mole percent, condensing in the above-recited condensation step at least about 25 mole percent of the reactor off-gas, and, following the above-recited substantially adiabatic vaporization step, heating and partially vaporizing the condensate to obtain a recycle liquid having less than about 20 mole percent ethylene.

2. The process of claim 1 wherein a nonconjugated hydrocarbon diene having 5–22 carbon atoms is copolymerized with ethylene and the alpha-olefin, the proportion of said diene being up to about 10 weight percent of the solution in the reactor.

3. The process of claim 2 wherein the copolymer product contains about 1–20 weight percent of the diene component.

4. The process of claim 3 wherein the solvent is hexane.

5. The process of claim 4 wherein the copolymer product contains about 2–8 weight percent of the diene component.

6. The process of claim 1 in which the alpha-olefin is propylene.

7. The process of claim 6 in which the solvent is hexane.

8. The process of claim 7 wherein the resulting copolymer contains about 1–20 weight percent of a non-conjugated hydrocarbon diene component having 5–22 carbon atoms.

9. The process of claim 8 wherein the copolymer contains about 20–35% propylene by weight.

* * * * *